US008745402B2

(12) United States Patent
Lin et al.

(10) Patent No.: US 8,745,402 B2
(45) Date of Patent: Jun. 3, 2014

(54) METHOD FOR CONSTRUCTING INNER CODES FOR ANTI-COLLUSION FORENSIC CODE FOR WATERMARKING DIGITAL CONTENT

(75) Inventors: Wan-yi Lin, College Park, MD (US); Shan He, Plainsboro, NJ (US); Jeffrey Adam Bloom, West Windsor, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 388 days.

(21) Appl. No.: 12/998,143

(22) PCT Filed: Sep. 26, 2008

(86) PCT No.: PCT/US2008/011210
§ 371 (c)(1),
(2), (4) Date: Mar. 22, 2011

(87) PCT Pub. No.: WO2010/036255
PCT Pub. Date: Apr. 1, 2010

(65) Prior Publication Data
US 2011/0170737 A1    Jul. 14, 2011

(51) Int. Cl.
*G06F 21/00* (2013.01)
*G06T 1/00* (2006.01)
(52) U.S. Cl.
CPC ......... *G06T 1/005* (2013.01); *G06T 2201/0063* (2013.01)
USPC ....................................................... 713/176
(58) Field of Classification Search
CPC .......... H04N 21/8358; H04N 1/32144; H04N 1/32149; G06T 1/0021; G06T 1/0028; G06T 1/0035; G06T 1/0042; G06T 1/005; G06T 1/0057; G06T 1/0064; G06T 1/0071; G06T 1/0085; G06T 1/0092
USPC ............ 713/150, 164–167, 176–179; 726/26
See application file for complete search history.

(56) References Cited

U.S. PATENT DOCUMENTS

| 6,563,937 B1 * | 5/2003 | Wendt ........................... 382/100 |
| 2004/0143742 A1 * | 7/2004 | Muratani ...................... 713/176 |

(Continued)

OTHER PUBLICATIONS

M. Wu, W. Trqappe, Z. Wang, and K.J. Ray Liu, "Collusion Resistant Fingerprinting for Multimedia," IEEE Signal Processing Magazine, vol. 21, No. 2, pp. 15-27, Mar. 2004.*
Trappe et al., "Anti-Collusion Fingerprinting for Multimedia", IEEE Transactions on Signal processing, vol. 51, No. 4, Apr. 2003, pp. 1069-1087.
Schaathun, "Attack Analysis for He & We's Joint Watermarking/Fingerprinting Scheme", LNCS 5041, Heidelberg, Berlin, 2008, pp. 45-59, 2008.

(Continued)

*Primary Examiner* — Darren B Schwartz
(74) *Attorney, Agent, or Firm* — Robert D. Shedd; Jeffrey M. Navon; Catherine A. Cooper (57) ABSTRACT

A method and apparatus are described including generating a unique code for each of a plurality of users using a plurality of symbols, generating a plurality of codes representing the plurality of symbols, substituting the plurality of codes into the unique code for each of the plurality of users, permuting the code resulting from the substitution to produce a codeword for each of the plurality of users and embedding the codeword into digital content. The second generating act further includes generating a string of first symbols followed by second symbols, wherein the first symbols are all ones and the second symbols are all negative ones, wherein a number of first symbols is equal to a number of the second symbols, and wherein if a length of the first symbols followed by the second symbols is less than a length of the code, then the first symbols followed by the second symbols are repeated until the code length is filled.

15 Claims, 7 Drawing Sheets

(56) References Cited

U.S. PATENT DOCUMENTS

| | | | |
|---|---|---|---|
| 2005/0154893 A1* | 7/2005 | Muratani | 713/176 |
| 2005/0179955 A1* | 8/2005 | Shovgenyuk et al. | 358/3.28 |
| 2005/0220322 A1* | 10/2005 | Olesen et al. | 382/100 |
| 2007/0180537 A1* | 8/2007 | He et al. | 726/32 |
| 2007/0255956 A1* | 11/2007 | Muratani | 713/176 |
| 2008/0226124 A1* | 9/2008 | Seo et al. | 382/100 |
| 2009/0049558 A1* | 2/2009 | Lotspiech | 726/28 |
| 2009/0228592 A1* | 9/2009 | Snyder | 709/226 |
| 2009/0288170 A1* | 11/2009 | Osawa et al. | 726/26 |

OTHER PUBLICATIONS

He etal., "Joint Coding and Embedding Techniques for Multimedia Fingerprinting", IEEE Transactions on Information Forensics and Security, vol. 1, No. 2, Jun. 2006, pp. 231-247.

Lu, "Performance Analysis of Digital Communication Systems", The Mitre Corporation, 1994 IEEE, Eatontown, NJ, 1994, pp. 738-744.

Search Report Dated July 21, 2009, PCT/US2008/011210.

* cited by examiner

METHOD FOR CONSTRUCTING INNER CODES FOR ANTI-COLLUSION FORENSIC CODE FOR WATERMARKING DIGITAL CONTENT

This application claims the benefit, under 35 U.S.C. §365 of International Application PCT/US2008/011210, filed Sep. 26, 2008, which was published in accordance with PCT Article 21(2) on Apr. 1, 2010 in English.

FIELD OF THE INVENTION

The present invention is directed to watermarking of digital content and, in particular, to the construction of inner codes used to generate watermarks to resist collusion attacks mounted against watermarks embedded in digital content.

BACKGROUND OF THE INVENTION

As used herein, the terms content or digital content may include, but are not limited to, audio, video or multimedia content. Content or digital content can be thought of as a digital signal. Watermarking is the process of modifying the content in order to embed information into the content and the corresponding process of recovering that information from the modified content. One example of such watermark information is a digital forensic code added to or embedded in content after production and before or during distribution. In this case, the watermark or digital forensic code is intended to apply a unique identifier to each of many copies of a multimedia work that are otherwise identical. In one application, this can be used to identify the source of an illegally copied content. Watermarking digital content, such as digital cinema, is one technique to deter thieves from misappropriating a copy of the content and then illegally redistributing it. This technique also encourages authorized distributors of digital content to maintain high security standards because watermarking can identify the specific authorized dealer from which the misappropriated copy originated. For example, if an illegal copy of the digital content is confiscated, the watermark information within the digital content can be used to determine the identity of the authorized distributor and, perhaps, the time and place of the public showing or sale of the digital content by the authorized distributor via the use of serial numbers in the forensic code. With this information, an investigation can begin at the identified authorized distributor to determine the conditions under which the misappropriation occurred.

In many applications, a unit of digitally watermarked content may undergo some modification between the time it is embedded and the time it is detected. These modifications are called "attacks" because they generally degrade the watermark and render its detection more difficult. If the attack is expected to occur naturally during the process of authorized or unauthorized distribution, then, the attack is considered "non-intentional". Examples of non-intentional attacks can be: (1) watermarked content that is cropped, scaled, JPEG compressed, filtered etc. (2) watermarked content that is converted to NTSC/PAL SECAM for viewing on a television display, MPEG or DIVX compressed, re-sampled etc. On the other hand, if the attack is deliberately done with the intention of thwarting the purpose of the watermark, then the attack is "intentional", and the party performing the attack is a thief or pirate. The three classes of intentional attack are unauthorized embedding, unauthorized detection, and unauthorized removal. This invention is concerned with unauthorized removal; removing the watermark or impairing its detection (i.e. the watermark is still in the content but cannot be easily retrieved by the detector). Unauthorized removal attacks generally have the goal of making the watermark unreadable while minimizing the perceptual damage to the content. Examples of attacks can be small, imperceptible combinations of line removals/additions and/or local rotation/scaling applied to the content to make difficult its synchronization with the detector (many watermark detectors are sensitive to de-synchronization).

One type of attack is a collusion attack where different copies are combined in an attempt to disguise or scramble the different digital watermark information contained in each. Attackers may also perform additional processing on the colluded copy before re-distributing the processed colluded copy. The additional processing may cause errors in the detected bits of the forensic codes. Without careful design, the forensic watermarking system can be easily broken by an attack by two or three colluders.

Prior art works on forensic marking codes design by Boneh-Shaw and Tardos are designed to resist collusion attacks. However, the Boneh-Shaw approach has the drawbacks of requiring a very long code and providing low collusion resistance when applied to multimedia signals, i.e. only a few colluders can break the system. The Tardos approach has good collusion resistance and requires shorter code length. However, its computational complexity and storage consumption during the code generation and detection is ten thousand times of that of a comparable Error Correcting Code (ECC) based forensic code. The ECC-based forensic marking scheme proposed by He and Wu uses Gaussian spread spectrum embedding to carry the code symbol rather than using a binary inner code. Since that scheme specifically uses spread spectrum embedding, it may not be applicable to other embedding schemes. It would be useful to develop a technique for constructing a binary inner code for generation of collusion-resistant watermarks that is also computationally efficient and has a reasonable length.

SUMMARY OF THE INVENTION

The present invention addresses the problems and issues raised above by the existing schemes and is directed to an inner binary orthogonal code designed to be used with the ECC outer code.

A method and apparatus are described including generating a unique code for each of a plurality of users using a plurality of symbols, generating a plurality of codes representing the plurality of symbols, substituting the plurality of codes into the unique code for each of the plurality of users, permuting the code resulting from the substitution to produce a codeword for each of the plurality of users and embedding the codeword into digital content. The second generating act further includes generating a string of first symbols followed by second symbols, wherein the first symbols are all ones and the second symbols are all negative ones, wherein a number of first symbols is equal to a number of the second symbols, and wherein if a length of the first symbols followed by the second symbols is less than a length of the code, then the first symbols followed by the second symbols are repeated until the code length is filled.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

As used herein, "/" denotes alternative names for the same or similar components or structures. That is, a "/" can be taken as meaning "or" as used herein. A digital forensic code/watermark can be employed in a technique for identifying users who misappropriate multimedia content for illegal distribution or redistribution. These forensic codes/watermarks are typically embedded into the content using watermarking techniques that are designed to be robust to a variety of attacks. One type of attack against such digital forensic codes is collusion, in which several differently marked copies of the same content are combined to disrupt the underlying forensic watermark information which identifies an authorized source of the digital multimedia content. A special challenge in multimedia forensic codes design is that when the protected data is multimedia, the colluders usually apply post-processing after collusion that forms an erroneous channel. For instance, the colluders can compress the multimedia to reduce the data size before redistributing the colluded copy. Therefore, it is important to design a collusion-resistant forensic code that is robust to channel error.

Generally, there are two types of collusion attacks that are widely studied; interleaving and majority attacks. In an interleaving attack, the colluders contribute copies of their forensic data on a bit by bit basis in roughly equal shares in an effort to evade valid forensic code/watermark detection. This type of attack can commence when there are two or more colluding users. This method threatens to result in a false positive detection of an innocent authorized distributor as one source of the misappropriated copy of the protected digital content. In a majority attack, the colluders combine their forensic data on a bit by bit basis such that the majority of bit states among the colluders is selected and placed in the final colluded copy of the protected digital content. This type of attack can commence when there are three or more colluding users. This method can also produce false positive results in forensic code word detection.

The present invention is directed to a method and apparatus for constructing an inner code for ECC based forensic codes to resist various collusion attacks, such as majority attack and interleaving attack, on watermarks embedded in digital multimedia signals. Substitution (also sometime called concatenation) of two orthogonal binary codes to construct the inner code for ECC-based forensic code is used.

Figure 1:
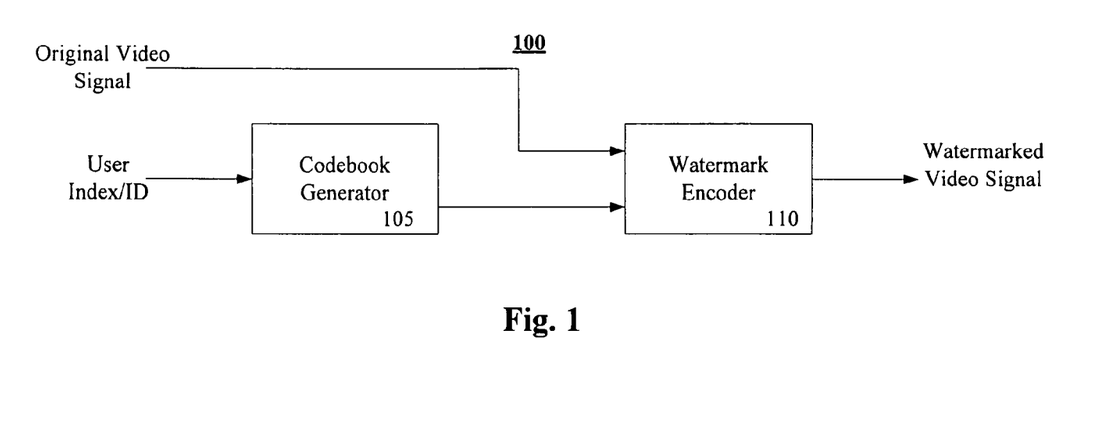
FIG. 1 illustrates a watermark embedding process.
Figure 2:
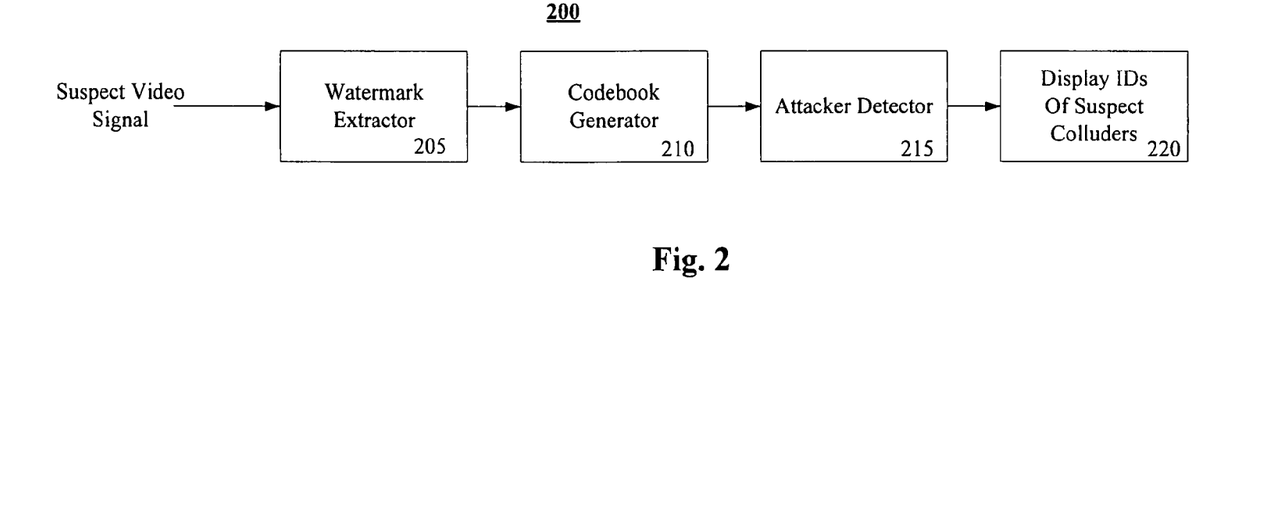
FIG. 2 illustrates a watermark detection process.

FIGS. 1 and 2 show the general embedding and detection process of the forensic code. During the embedding process, a codeword for each user is generated. The set of all codewords is collectively called codebook. Based on the input user index, a codeword for that user is retrieved from the codebook and his/her codeword is embedded into the original signal through digital watermarking techniques. The output of this process is digital watermarked signal for the corresponding user.

During the detection process, the test signal is input to the watermark detector to extract the test forensic codeword. The codebook is generated or retrieved and each user's forensic codeword is used to compare with the test forensic codeword in the colluder detector. The output is the accused colluders.

FIG. 1 depicts a block diagram of a forensic codeword/watermark embedding system 100 implemented using a computing system. Initially, the codeword for each user is generated and stored in a codebook. In one embodiment, the codebook is digital information representing some or all of the codewords for authorized users of a digital video product. Based on the input user index/ID (identifier), the codeword for an identified user is generated 105. Such codeword generation can be performed by retrieving data stored in a memory or it can be generated when the watermarking process is started. The user codeword is then combined with the original content in an encoder 110. The result of encoding is a watermarked signal where the codeword is embedded into the original content. The output of encoder 110 is content that has a watermarked signal embedded therein for distribution by the corresponding authorized user.

FIG. 2 shows a general code detector 200 of a watermark/forensic code. The general code detector 200 may be implemented on a computer system for generation and display of results. Initially, a suspect signal is input into a forensic code/watermark extractor 205. Watermark information from the suspect video is extracted. All of the user codewords are generated by the codeword generator 210. This codeword generator can be a similar device to that shown in FIG. 1, item 105. An attacker detector 210 then detects codewords of the attackers and the codewords are compared with the list of all codewords to determine the attacker identities. The identities of suspected colluders can be displayed 220. Such a display includes, but is not limited to display on a terminal/monitor or a printing device. In this instance, a user is an authorized user of the encoded content. For example, the user could be an authorized distributor of a digital content, such as a movie. If pirated content is uncovered, then one or more of the authorized users having codewords that correspond to the codewords in the suspect content may be colluders. Here, the term colluder refers to an authorized user that allowed a copy of the content to fall into the hands of content pirates/thieves.

Figure 3A:
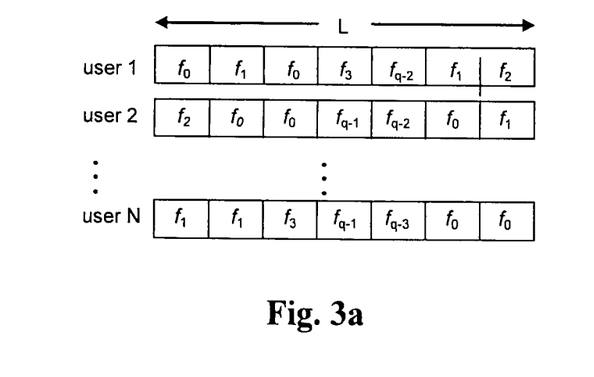
FIG. 3a depicts an example outer code for an ECC-based encoder.
Figure 3B:
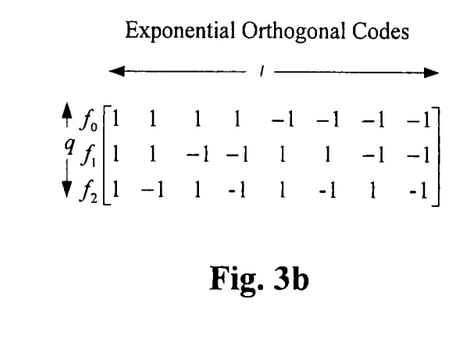
FIG. 3b depicts an orthogonal inner code for an ECC-based encoder.
Figure 3C:
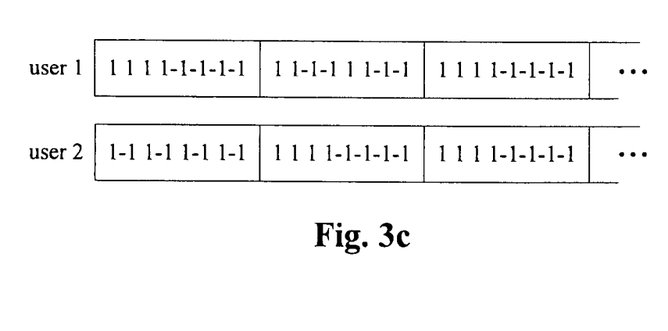
FIG. 3c depicts a combination of an inner code into and outer code.
Figure 3D:
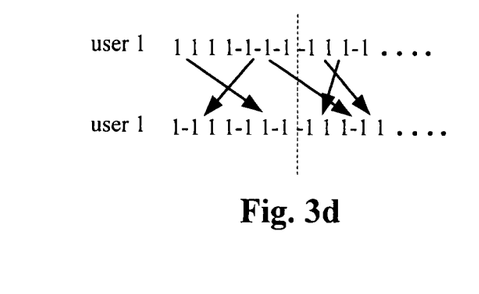
FIG. 3d depicts a randomization for an ECC-based encoder mechanism.

FIGS. 3a-3d depict a general method of generating a basic ECC-based forensic code. The first step of FIG. 3a is to generate an ECC outer code for N users with L symbols and q alphabets $\{f_0, f_1, \ldots, f_{q-1}\}$. In one embodiment, the outer code of FIG. 3a is constructed as a Reed-Solomon (RS) code due to its large minimum distance. FIG. 3b depicts example binary inner codes to be used as alphabets for a basic ECC where zeros are depicted as −1 values. FIG. 3c shows the result of substitution of the inner codes of FIG. 3b into the outer codes of FIG. 3a for each user. This is one way to generate a basic ECC-based codeword for a user. In one embodiment, the basic ECC-based codeword can be further manipulated by randomly permuting the bits for each user. FIG. 3d depicts a random permutation of the codeword bits of FIG. 3c for user 1. This "random" permutation may be conducted by a randomizer and is generally performed to prevent the codeword structure from being broken down by attackers. The result after the operation of FIG. 3d is a randomized basic ECC-based codeword for each user.

Referring again to FIG. 3b and the inner codes, the q orthogonal binary inner codes with value +1/+1 and length l are used to modulate the q alphabets and substitute the inner code into the outer code. The overall code length is Ll bits and the total number of users is $N=q^t$, where t is the dimension of the outer Reed-Solomon code. The q inner codewords, called exponential orthogonal code are designed to preserve the colluders' information as much as possible. The columns of this exponential orthogonal inner code consist of all $2^q$ possible combinations of 1 and −1, one column corresponding to the bits from q codewords at one bit position. Thus the code has code length $l=2^q$. The orthogonal inner codes shown in FIG. 3b for the basic ECC are constructed as follows. For the $i^{th}$ codeword $f_{i-1}$, the first $2^{q-i}$ bits are 1s and the next $2^{q-i}$ are −1s. Then the same code is repeated times, ending up with $2^q$ bits. The inner code matrix of q=3 is shown in FIG. 3b. The first 4 bits of the first codeword $f_0$ are 1s and the rest bits are −1s; the first 2 bits of the second codeword $f_1$ are 1s and the next 2 are −1s, and then the code pattern is repeated once. The third/last codeword $f_3$ has alternating 1s and −1s starting with a 1. This produces an inner code for a basic ECC codeword.

A correlation based detector is employed in ECC forensic code scheme to detect users' codewords to identify colluders. Let y be the forensic code extracted from the colluded copy, $x_i$ be the forensic code of user i, and U be the set of all users. The detection statistic of user i is $$T_i = \sum_{j=1}^{L} T_i^{(j)} / L, \quad (1)$$

$$\text{with } T_i^{(j)} = \frac{<y^{(j)}, x_i^{(j)}>}{\|x_i^{(j)}\|}, \quad (2)$$

where $x_i^{(j)}$ and $y^{(j)}$ are the codewords corresponding to $j^{th}$ symbol of $x_i$ and y, respectively. In a maximum detector, user i is accused as a colluder if he/she has the highest detection statistic, i.e. $T_i \geq T_k \, \forall k \in U$. In a thresholding detector, user i is accused as a colluder if his/her detection statistic is greater than a threshold h, i.e. $T_i \geq h$. Detection using Equation (1) may be termed soft detection.

It can be shown that for the ECC based binary forensic code, when the inner code is an exponential orthogonal code, the system performs better when the relative distance, i.e. the minimum_distance divided by the code_length of the outer ECC code gets larger. For Reed-Solomon code, the relative distance can be increased by increasing its alphabet size q. However, the code length of the exponential binary orthogonal code is $2^q$, which becomes too large when the alphabet size increases. Thus, a binary orthogonal inner code generated by substituting/concatenating two orthogonal binary codes is proposed.

Using majority collusion as an example, a theoretical analysis of the probability of detection of ECC-based code is as follows. The performance analysis under other attacks can be performed in a similar way.

The multimedia processing of the colluded copy is modeled as a binary symmetric channel (BSC). That is, the probability that a 0 is recognized as a 1 (and vice versa) is δ and the probability that a 0 is recognized as a 0 (and that a 1 is recognized as a 1) is 1−δ. Let l be the length of the inner codes, δ be the bit error rate (BER) of the binary symmetric channel (BSC), x be the inner code, and $y^{(j)}$ be the majority-colluded inner code of the $j^{th}$ symbol. $y'^{(j)}$ is the resulting inner code after $y^{(j)}$ has gone through a BSC with BER=δ. The detection statistics for user i, $T_i$ is obtained as $$T_i = \sum_{j=1}^{15} T_i^{(j)} / 15,$$

where $T_i^{(j)} = <y^{(j)'}, x_i^{(j)}>/\sqrt{l}$ as in Equation (2)

The BSC can be modeled by flipping the bits with probability δ. When $y'^{(j)}$ and $x^{(j)}$ is +1/−1, the order of the flipping operation and multiplication can be switched/reversed. Thus, $<y'^{(j)},$ $$x^{(j)}> = \sum_{i=1}^{l} y'^{(j)}(i) \times x^{(j)}(i) =$$

$$\sum_{i=1}^{l} (y^{(j)}(i) \text{ flip } w.p.\delta) \times x^{(j)}(i) = \sum_{i=1}^{l} \left( (y_i^{(j)} \times x_i^{(j)}) \text{ flip } w.p.\delta \right),$$

where $y'^{(j)}(i)$, $y^{(j)}(i)$, and $x^{(j)}(i)$ are the $i^{th}$ bit of y'(i), $y^{(j)}$, and $x^{(j)}$ respectively. $<y'^{(j)}, x^{(j)}>$ can be calculated by treating the process as sending the l bitwise products $y^{(j)}(i) \times x^{(j)}(i)$, $1 \leq i \leq l$ through the BSC, and then summing them up. Let $a_i$ be the random variable that $y^{(j)}(i) \times x^{(j)}(i)$ that passes through BSC with BER=δ when $y^{(j)}(i)=x^{(j)}(i)$, and $b_i$ be the random variable that $y^{(j)}(i) \times x^{(j)}(i)$ that passes through the BSC with BER=δ when $y^{(j)}=-x^{(j)}(i)$. Therefore, $<y'^{(j)}, x^{(j)}>$ can be modeled as the sum of $a_i$ and $b_i$, in which $$a_i = \begin{cases} 1 & w.p. \quad 1-\delta \\ -1 & w.p. \quad \delta \end{cases} \quad (3)$$

and $$b_i = \begin{cases} 1 & w.p. \quad \delta \\ -1 & w.p. \quad 1-\delta. \end{cases}$$

where "w.p." stands for "with probability".

Thus the expectation of $a_i$ is 1−2δ, and the variance is 4δ(1−δ). The expectation of $b_i$ is 2δ−1, and $b_i$'s variance is 4δ(1−δ). For instance, if $y^{(j)}$ and $x^{(j)}$ are orthogonal, then $y^{(j)}$ and $x^{(j)}$ share the same bits at l/2 positions and have different bits at the other l/2 positions. Thus, $<y^{(j)}, x^{(j)}>$ can be modeled as the sum of l/2 independent identical distribution (i.i.d.) $a_i$, and l/2 i.i.d. $b_i$. Since the inner code length l is on the order of $2^{16}$, it is long enough to apply central limit theorem and model $T_i^{(j)} = <y'^{(j)}, x^{(j)}>/>\sqrt{l}$ as a Gaussian random variable.

Consider the worst case scenario that the RS outer code is equally distanced with the minimum distance D, therefore, there must be exactly L-D shared symbols between the outer codes of any two users. Assuming the RS codes are symmetric in the sense that given one codeword z, and a randomly selected another codeword z', $P[z^{(i)}=z'^{(i)}]$ is the same for all $1 \le i \le L$, where $z_i$ and $z'_i$ are the $i^{th}$ symbol of z and z', respectively. Under these assumptions, the probability of all cases of the outer codes can be calculated and then the distributions of $T_i$ for every user i can be obtained. For instance, if there are two colluders, then P[colluders share L-D symbols in outer codes]=1. As a result, $T_{colluder} = (L-D) \times T_{colluder}^{agreed\ code} + D \times T_{colluder}^{disagreed\ code}$, which can also be modeled as a Gaussian random variable. Thus the detection statistics of every user can be modeled as a Gaussian random variable, then the probability of detection can be obtained by calculating the probability that the highest detection statistics belong to a colluder.

In the following discussion, the code-analysis procedure of the present invention is demonstrated through an example. Assuming that there are $2^{20}$ users with three colluders applying majority attack, the Reed-Solomon (RS) code is constructed to have the alphabet size and the code length of $2^4$ and 15, respectively. Thus, the minimum distance of the RS outer code is 11, and the outer-code correlation is 4/15. Let $x_1^{(j)}, x_2^{(j)}, x_3^{(j)}$ be the inner codes of the $j^{th}$ symbol for the three colluders, and $X=\{x | x$ is an inner code and $x \ne x_1^{(j)}, x_2^{(j)}, x_3^{(j)}\}$. For each symbol position, the three colluders may have (first case) three distinct inner codes, or (second case) two of them share the same inner code $(x_3^{(j)}=x_2^{(j)}$, or (third case) all of them have the same code) $(x_1^{(j)}=x_2^{(j)}=x_3^{(j)})$. Under a majority attack, in the first case when $x_1^{(j)} \ne x_2^{(j)}$, $x_2^{(j)} \ne x_3^{(j)}$, and $x_1^{(j)} \ne x_3^{(j)}$, $$<y,x>=0 \forall x \in X, \text{ and}$$

$$<<y^{(j)}, x_1^{(j)}> = <y^{(j)}, x_2^{(j)}> <y^{(j)}, x_3^{(j)}> = l/2. \quad (4)$$

In the latter two cases, y will be equal to $x_3$ which is always orthogonal to any inner codes in X, and also $x_1^{(j)}$ in the second case, and)$<y^{(j)}, x_3^{(j)}> \ge 1$.

Looking at the distribution of the detection statistic $T_i^{(j)}$ for a codeword $x^{(j)}$ that is not involved in the collusion, $x^{(j)}$ may be a codeword from the innocent users' codeword X, or $x_1^{(j)}$ in the above second case, i.e. $x^{(j)}=x_1^{(j)}$ when $x_1^{(j)} \ne x_2^{(j)}=x_3^{(j)}$. Thus for $x^{(j)} \in X$ in the second case or $x^{(j)} \in X$ in the third case, $<y'^{(j)}$, $$x^{(j)} > / (l/2) = \left(\sum_{i=1}^{l/2} a_i\right) / (l/2) + \left(\sum_{i=1}^{l/2} b_i\right) / (l/2).$$

When l is long enough, by central limit theorem, $$\left(\sum_{i=1}^{l/2} a_i\right) / (l/2)$$

follows a normal/Gaussian distribution given by $N(1-2\delta, 4\delta(1-\delta)(l/2))$, and $$\left(\sum_{i=1}^{l/2} b_i\right) / (l/2)$$

also follows a normal/Gaussian distribution given by $N(2\delta-1, 4\delta(1-\delta)/l/2))$. In the notation used herein $N(m,v)$, m is the mean/expectation and v is the variance. Thus, $<y'^{(j)}, x^{(j)}>/(1/$ $2) = T_i^{(j)}/(\sqrt{l}/2)$ follows a normal/Gaussian distribution given by $N(0, 4\delta(1-\delta)/(l/4))$. Therefore, $T_i^{(j)}$ follows a normal/Gaussian distribution given by $N(0, 4\delta(1-\delta))$ if the $j^{th}$ symbol of user i $x_i^{(j) \delta X\ or\ x} \in X \cup \{x_1^{(j)}\}$ in the above second case.

The detection statistic $T_i^{(j)}$ for a codeword $x^{(j)}$ that contributes to the colluded copy is derived as follows. In the first case when all three colluder codewords are distinct, i.e. $x_1^{(j)} \ne x_2^{(j)}$, $x_2^{(j)} \ne x_3^{(j)}$, and $x_1^{(j)} \ne x_3^{(j)}$, $<y^{(j)}, x_1^{(j)}/(l/4)$ follows a normal/Gaussian distribution given by $N(2(1-2\delta), 16\delta(1-\delta)/(l/4))$. Thus $T_{colluder1}^{(j)}$ follows a normal/Gaussian distribution given by $N(\sqrt{l}(1-2\delta)/2, 4\delta(1-\delta))$, and $T_{colluder2}^{(j)}, T_{colluder3}^{(j)}$ also have the same distribution by symmetry. That is, when the colluded symbol is derived when all three symbols are different, the mean of the detection statistic is $\frac{1}{2}\sqrt{l}(1-2\delta)$. In the second case and the third case, when $x_1^{(j)} \cdot x_2^{(j)} = x_3^{(j)}$, or $x_1^{(j)} = x_2^{(j)} = x_3^{(j)}$, $y=x_3^{(j)}$. For colluder 3, $<y'^{(j)}, x_3^{(j)}>/l$ follows a normal/Gaussian distribution given by $N(1-2\delta, 4\delta(1-\delta)/l) => T_{colluder3}^{(j)}$ follows a normal/Gaussian distribution given by $N(\sqrt{l}(1-2\delta), 4\delta(1-\delta))$. That is, when the colluded symbol totally comes from one of the colluders, i.e. either all three colluders' symbols are the same, or two of them are the same, the mean of the detection statistic is $\sqrt{l}(1-2\delta)$. The variance is the same for both cases.

The notation $(c_1, c_2, c_3)$ is used to represent the symbol distribution among the three colluders at one symbol position. (1, 1, 1) means that all the three colluders have different inner codes, (2, 1, 0) means that two colluders share the same inner code, and the third colluder has a different code, and (3, 0, 0) indicates that all three colluders share the same inner code. For simplicity, it is assumed that the RS code has equal distance which is the minimum distance of the code 11. Thus, there are 4 symbols shared between every pair of the codewords. Without loss of generality, it is assumed that the first 4 symbols are shared between the first two colluders, colluder 1 and colluder 2, and the shared symbol set is denoted as $sym_{12}$. Similarly, the shared symbol set between colluder 1 and colluder 3 is denoted as $sym_{13}$ and the shared symbol set between colluder 2 and colluder 3 is denoted as $sym_{23}$. When the third colluder, colluder 3, joins, there are several cases. $(sym_{13} \cap sym_{23}) \cap sym_{12} = \emptyset$. Then there is no symbol position where all three colluders share the same symbol, i.e. the number of (3, 0, 0) in the 15 symbol positions, #(3, 0, 0)=0. In order to keep the pair-wise shared symbol number equal to 4, $sym_{13} \cap sym_{23} = \emptyset$. As a result, among the 15 symbols positions, 12 positions in $\{sym_{12} \cup sym_{13} \cup sym_{23}\}$ have (2, 1, 0), the remaining 3 positions are (1, 1, 1). Thus the probability of the event $\{\#(3, 0, 0)=0\}$ can be calculated as:

$$P[\#(3,0,0)=0] = P[(1,1,1)=3,(2,1,0)=12,(3,0,0)=0]$$
$$= C_{11}^4 C_7^4 / (C_4^4 + C_4^3 C_{11}^1 C_{10}^1 + C_4^2 C_{11}^2 C_9^2 + C_4^1 C_{11}^3 C_8^3 + C_{11}^4 C_7^4).$$

$$P[\#(3,0,0)=1] = P[(1,1,1)=5,(2,1,0)=9,(3,0,0)=1]$$
$$= C_4^1 C_{11}^3 C_8^3 / (C_4^4 + C_4^3 C_{11}^1 C_{10}^1 + C_4^2 C_{11}^2 C_9^2 + C_4^1 C_{11}^3 C_8^3 + C_{11}^4 C_7^4),$$

$$P[\#(3,0,0)=2] = P[(1,1,1)=7,(2,1,0)=6,(3,0,0)=2]$$
$$= C_4^2 C_{11}^2 C_9^2 / (C_4^4 + C_4^3 C_{11}^1 C_{10}^1 + C_4^2 C_{11}^2 C_9^2 + C_4^1 C_{11}^3 C_8^3 + C_{11}^4 C_7^4),$$

$$P[\#(3,0,0)=3] = P[(1,1,1)=9,(2,1,0)=3,(3,0,0)=3]$$
$$= C_4^3 C_{11}^1 C_{10}^1 / (C_4^4 + C_4^3 C_{11}^1 C_{10}^1 + C_4^2 C_{11}^2 C_9^2 + C_4^1 C_{11}^3 C_8^3 + C_{11}^4 C_7^4),$$

$$P[\#(3,0,0)=4] = P[(1,1,1)=11,(2,1,0)=0,(3,0,0)=4]$$
$$= C_4^4 / (C_4^4 + C_4^3 C_{11}^1 C_{10}^1 + C_4^2 C_{11}^2 C_9^2 + C_4^1 C_{11}^3 C_8^3 + C_{11}^4 C_7^4).$$

$$P[\#(3,0,0)=k] = 0, \text{ for all } k \ne 0,1,2,3,4 \quad (5)$$

Take the event #(1, 1, 1)=11, #(2, 1, 0)=0, #(3, 0, 0)=4 as an example. In this case, all three colluders have the same symbols for the first four symbol positions. Based on the inner code analysis, the detection statistics of the three colluders, $T_{colluder1}$, $T_{colluder2}$, and $T_{colluder3}$, will have the same distribution, $N(19\sqrt{l}(1-2\delta)/2, 4\delta(1-\delta))$. As an innocent user, there are several cases/possibilities.

1. The innocent user also has the same symbols as the colluders for the first four symbol positions as shown in the following figure. Then, the mean of the $T_i$ for this innocent user would be $4*\sqrt{l}(1-2\delta)$. This corresponds to the a $T_i$ distribution that follows a normal Gaussian distribution $N(4\sqrt{l}(1-2\delta), 4\delta(1-\delta))$ with probability $C_4^4 \times C_{11}^0/K_4$, where $K_4=C_4^4+(C_4^3 \times C_{11}^1 C_{10}^1 C_9^1)+(C_4^2 \times C_{11}^2 C_9^2 C_7^2)+(C_4^1 \times C_{11}^3 C_8^3 C_5^3)$.

2. The innocent user has the same symbols as the colluders for the first three out of the first four symbol positions as shown in the following figure. In order to keep a total of four matched symbols between any pair of codewords, the innocent user must have one symbol in the remaining 11 positions that matches with each of the three colluders. These matched symbol positions cannot overlap. Then, the mean of the $T_i$ for this innocent user would be $$3*\sqrt{l}(1-2\delta) + 3*\frac{1}{2}\sqrt{l}(1-2\delta) = \frac{9}{2}\sqrt{l}(1-2\delta).$$

This corresponds to a $T_i$ distribution that follows a normal/Gaussian distribution $N(9\sqrt{l}(1-2\delta), 4\delta(1-\delta))$ with probability $C_4^3 \times C_{11}^1 C_{10}^1 C_9^1/K_4$, where $K_4=C_4^4+(C_4^3 \times C_{11}^1 C_{10}^1 C_9^1)+(C_4^2 \times C_{11}^2 C_9^2 C_7^2)+(C_4^1 \times C_{11}^3 C_8^3 C_5^3)$.

3. The innocent user has the same symbols as the colluders for the first two out of the first four symbol positions as shown in the following figure. In order to keep a total of four matched symbol between any pair of codewords, the innocent user must have two symbols in the remaining 11 positions that match with each of the three colluders. These matched symbol positions cannot overlap. Then, the mean of the $T_i$ for this innocent user would be $$2*\sqrt{l}(1-2\delta) + 6*\frac{1}{2}\sqrt{l}(1-2\delta) = 5\sqrt{l}(1-2\delta).$$

This corresponds to a $T_i$ distribution that follows a normal/Gaussian distribution $N(5\sqrt{l}(1-2\delta), 4\delta(1-\delta))$ with probability $C_4^2 \times C_{11}^2 C_9^2 C_7^2/K_4$, where $K_4=C_4^4+(C_4^3 \times C_{11}^1 C_{10}^1 C_9^1)+(C_4^2 \times C_{11}^2 C_9^2 C_7^2)+(C_4^1 \times C_{11}^3 C_8^3 C_5^3)$.

4. The innocent user has the same symbols as the colluders for the first one out of the first four symbol positions as shown in the following figure. In order to keep a total of four matched symbol between any pair of codewords, the innocent user must have three symbols in the remaining 11 positions that match with each of the three colluders. These matched symbol positions cannot overlap. Then, the mean of the $T_i$ for this innocent user would be $$1*\sqrt{l}(1-2\delta) + 9*\frac{1}{2}\sqrt{l}(1-2\delta) = \frac{11}{2}\sqrt{l}(1-2\delta).$$

This corresponds to a $T_i$ distribution that follows a normal/Gaussian distribution $N(11\sqrt{l}(1-2\delta), 4\delta(1-\delta))$ with probability $C_4^1 \times C_{11}^3 C_8^3 C_5^3/K_4$, where $K_4=C_4^4+(C_4^3 \times C_{11}^1 C_{10}^1 C_9^1)+(C_4^2 \times C_{11}^2 C_9^2 C_7^2)+(C_4^1 \times C_{11}^3 C_8^3 C_5^3)$.

Figure 7:
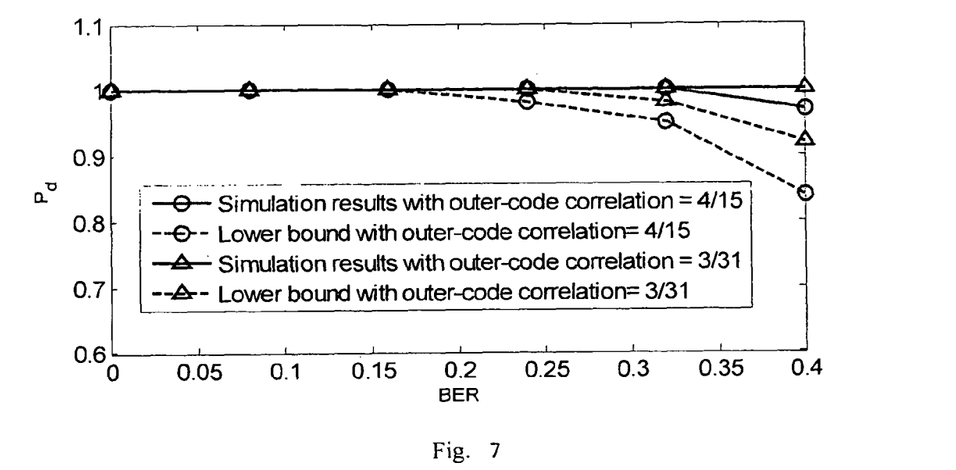
FIG. 7 shows the lower bounds and the simulation results of the probability of detection of ECC-based codes of the present invention with different code correlations and different inner codes.

Similarly, the detection statistics of the three colluders and each innocent user for the events #(3, 0, 0)=k, where k=0, 1, 2, 3 can be obtained. Given the detection statistics of all the users under all the cases above, the probability of detection of ECC-based code under the assumption of equal distance can be obtained. Note that the actual ECC code's pair-wise distance is not always equal to the minimum distance. Many of them are larger than the assumed distance. Also, the total number of codeword combinations is $C_{15}^4(C_4^4+C_4^3 C_{11}^1 C_{10}^1+C_4^2 C_{11}^2 C_9^2+C_4^1 C_{11}^3 C_8^3+C_{11}^4 C_7^4)=8.3\times 10^7$, which is larger than the total number of users $1.05\times 10^6$. Thus, all the cases are not seen in the codebook. As a result, the probability analysis that is obtained is the lower bound of the actual performance as shown in FIG. 7, where numerical evaluation of the analysis is illustrated as the dashed line with circles and the simulation results based on 200 iterations is shown as the line with circles.

For three colluders mounting a majority attack, a summary is as follows:

Let D be the minimum distance of the outer code, L be the length of outer code and l be the length of the exponential orthogonal inner code. The colluder's detection statistics $T_{colluder}$ follow a normal/Gaussian distribution given by $N((D+(L-D)/2)\sqrt{l}(1-2\delta), 4\delta(1-\delta))$, and the innocent users' detection statistics will have several possibilities, and the one with highest mean $T_i^{max}$ follows a normal/Gaussian distribution given by $N((\lfloor D/3 \rfloor 2+(L-D))\sqrt{l}(1-2\delta), 4\delta(1-\delta))$ if $D<L-3$, and $T_i^{max}$ follows a normal/Gaussian distribution given by $N(3(L-D)\sqrt{l}(1-2\delta)/2, 4\delta(1-\delta))$ if $D \geq L-3$. Therefore, the difference between the mean of $T_{colluder}$ and $T_i^{max}$ will be at least $(D-\lfloor D/3 \rfloor)\sqrt{l}$ if $D<L-3$, and $2D-L$ if $D \geq L-3$. Thus the difference between the mean of $T_{colluder}$ and $T_i^{max}$ is a non-decreasing function of D. Since the forensic detector chooses the user with largest detection statistics, the larger difference between the mean of $T_{colluder}$ and $T_i^{max}$, the better the colluder-tracing performance.

From the analysis above, it can be seen that the outer-code minimum distance plays an important role. For example, if the minimum distance is equal to the code length, i.e. overall code correlation is 0, then the mean of $T_i$ for any innocent user i would be reduced to 0, while the mean of $T_{colluder}$ for the colluders will be $15\sqrt{l}/2$. Thus the overall detection probability should be increased. Consideration is now given reducing the code correlation by employing a RS code with alphabet size 32, dimension 4 and the outer code length 31. In this situation, if an orthogonal inner code is still used, the overall correlation becomes $3/31$. Compared with code used in prior work by the same inventors, where RS code had an alphabet size 16, dimension 5 and code length 15, the correlation is reduced by $0.17(4/15-3/31)$. Thus much improved performance is expected using this new code setting. However, if a binary inner code as described herein is still used, the overall code length would be increased to $31 \times 2^{32} \approx 1.3 \times 10^{11}$, which is larger than what can be afforded in terms of storage and complexity. Therefore, to maintain the same code length, a family of orthogonal inner codes with shorter code length is proposed.

Given a set of binary orthogonal codes which take values ±1, if the bits that take the value "1" are replaced by a binary sequence V, and the "−1" bits are replaced with −V, the codes are still orthogonal to each other. Furthermore, if the two sets of orthogonal codes are concatenated, the concatenated codes are also orthogonal. Here, the concatenation/matrix multiplication of X and Y, denoted by $X \otimes Y$, is defined as follows:

$$X = \begin{bmatrix} 1 & 1 \\ 1 & -1 \end{bmatrix},$$

$$X \otimes Y = \begin{bmatrix} Y & Y \\ Y & -Y \end{bmatrix}.$$

Therefore, concatenating/multiplying the $q/q_c$ exponential orthogonal inner with other $q_c$ orthogonal sequences (e.g., an orthogonal matrix, such as but not limited to a Hadamard matrix), results in q orthogonal inner codes. Following are listed the two orthogonal codes that are to be concatenated/multiplied by the exponential orthogonal inner codes.

Hadamard matrix: The Hadamard matrix is a $q_c \times q_c$ orthogonal matrix which exists when $q_c-2^m$, $m \in N$. A Hadamard matrix $H_{q_c}$ with order $q_c$ can be generated recursively by $$H_{q_c} = \begin{bmatrix} H_{q_c/2} & H_{q_c/2} \\ H_{q_c/2} & -H_{q_c/2} \end{bmatrix}, \text{ where } H_2 = \begin{bmatrix} 1 & 1 \\ 1 & -1 \end{bmatrix}.$$

If $H_{q_c}$ is concatenated/multiplied by the original inner code with order $q/q_c$, the final inner-code length would be $2^{q/q_c} \times q_c$. Since in this example, the required code length of the inner codes is $2^{15}$ which reduces the outer-code correlation by increasing the alphabet size to 32, $q_c=4$ is selected, $q/q_c=8$ and the concatenated/multiplied code is repeated $2^5$ times.

Exponential orthogonal inner code: If two exponential orthogonal inner codes with order $q/q_c$ and $q_c$ are concatenated/multiplied, then the resulting code would have order q with code length $2^{q/q_c+q_c}$. In this example, $q_c=4$ is selected, $q/q_c=8$ and the concatenated/multiplied code is repeated $2^3$ times.

In either of these two concatenated binary codes, the code length is significantly reduced from $2^q$ to $q_c 2^{q/q_c}$ or $2^{q/q_c+q_c}$.

Take as an example the concatenation/multiplication of two exponential orthogonal inner codes with $q=32$, $q_c=4$. The number of shared symbols for every pair of outer codes is 3, and outer-code correlation is $3/31$. All possibilities are exhaustively searched and it is determined that when there are three colluders mounting a majority attack, the colluded inner code $y^{(j)}$ is orthogonal to every $x \in X$, in spite of the relationship of the three colluders' codes. Also, $<y^{(j)}, x_1^{(j)}> = <y^{(j)}, x_2^{(j)}> = <y^{(j)}, x_3^{(j)}> = l'/2$ if $x_1^{(j)} \neq x_2^{(j)}$, $x_2^{(j)} \neq x_3^{(j)}$, and $x_1^{(j)} \neq x_3^{(j)}$. l' is the inner code length for $q=32$. Note that since the outer-code length has been expanded to 31, the inner-code length l' has to be shortened to $15l/31 \approx l/2$. Thus, the same analysis as above can be applied to arrive at $$P[\#(3,0,0)=0] = P[\#(1,1,1)=22, \#(2,1,0)=9, (3,0,0)=0]$$
$$= C_{28}^3 \times C_{25}^3/(C_3^3+C_3^2 C_{28}^1 C_{27}^1+C_3^2 C_{28}^2 C_{26}^2+C_3^0 C_{28}^3 C_{25}^3),$$

$$P[\#(3,0,0)=1] = P[\#(1,1,1)=24, \#(2,1,0)=6, (3,0,0)=1]$$
$$= C_3^1 C_{28}^2 C_{26}^2/(C_3^3+C_3^2 C_{28}^1 C_{27}^1+C_3^1 C_{28}^2 C_{26}^2+C_3^0 C_{28}^3 C_{25}^3),$$

$$P[\#(3,0,0)=2] = P[\#(1,1,1)=26, \#(2,1,0)=3, (3,0,0)=2]$$
$$= C_3^2 C_{28}^1 C_{27}^1/(C_3^3+C_3^2 C_{28}^1 C_{27}^1+C_3^1 C_{28}^2 C_{26}^2+C_3^0 C_{28}^3 C_{25}^3),$$

$$P[\#(3,0,0)=3] = P[\#(1,1,1)=28, \#(2,1,0)=0, (3,0,0)=3]$$
$$= C_3^3/(C_3^3+C_3^2 C_{28}^1 C_{27}^1+C_3^1 C_{28}^2 C_{26}^2+C_3^0 C_{28}^3 C_{25}^3),$$

$$P[\#(3,0,0)=k]=0, \text{ for all } k \neq 0, 1, 2, 3 \quad (6)$$

Take the event $\#(1, 1, 1)=28$, $\#(2, 1, 0)=0$, $\#(3, 0, 0)=3$ as an example. In this case, based on the inner code analysis, the detection statistics of the three colluders, $T_{colluder1}$, $T_{colluder2}$, and $T_{colluder3}$, will have the same distribution, $N(17\sqrt{L_{inn}}(1-2\delta)/\sqrt{2}, 4\delta(1-\delta))$. The detection statistics of innocent user i become $T_i$ follows a normal/Gaussian distribution $N(3\sqrt{l}(1-2\delta)/\sqrt{2}, 4\delta(1-\delta))$ with probability $C_3^3 \times C_{28}^0/K_3$, $T_i$ follows a normal/Gaussian distribution $N(7\sqrt{l}(1-2\delta)/2/\sqrt{2}, 4\delta(1-\delta))$ with probability $C_3^2 \times C_{28}^1 C_{27}^1 C_{26}^1/K_3$, $T_i$ follows a normal/Gaussian distribution $N(4\sqrt{l}(1-2\delta)/\sqrt{2}, 4(1\delta))$ with probability $C_3^1 \times C_{28}^2 C_{26}^2 C_{24}^2/K_3$, $T_i$ follows a normal/Gaussian distribution $N(9\sqrt{l}(1-2\delta)/2\sqrt{2}, 4\delta(1-\delta))$ with probability $C_3^0 \times C_{28}^3 C_{25}^3 C_{22}^3/K_3$, where $K_3 = C_3^3 + (C_3^2 \times C_{28}^1 C_{27}^1 C_{26}^1) + (C_3^1 \times C_{28}^2 C_{26}^2 C_{24}^2) + (C_3^0 \times C_{28}^3 C_{25}^3 C_{22}^3)$. Similarly, the detection statistics of the three colluders can be obtained and each innocent user for all the events $\#(3, 0, 0)=k$, where $k=0, 1, 2$.

Given the detection statistics of all the users under all the cases in (6), the lower bound of the probability of detection of the ECC code can be numerically examined. This lower bound is shown in FIG. 7 as the dashed line with triangles. The simulation result of the same setting is shown as the line with triangles in FIG. 7. Note that there is discrepancy between the two curves, and the difference mainly comes from the equal-distance assumption of RS code in the analysis. From FIG. 7, it can be seen that the probability of detection of the code with code correlation=$3/31$ remains 1 when BER=0.4, while the code with code correlation=$4/15$ cannot identify colluders perfectly. Thus, reducing the code correlation can effectively increase the collusion-resistance under BSC for ECC forensic marking codes.

Figure 8:
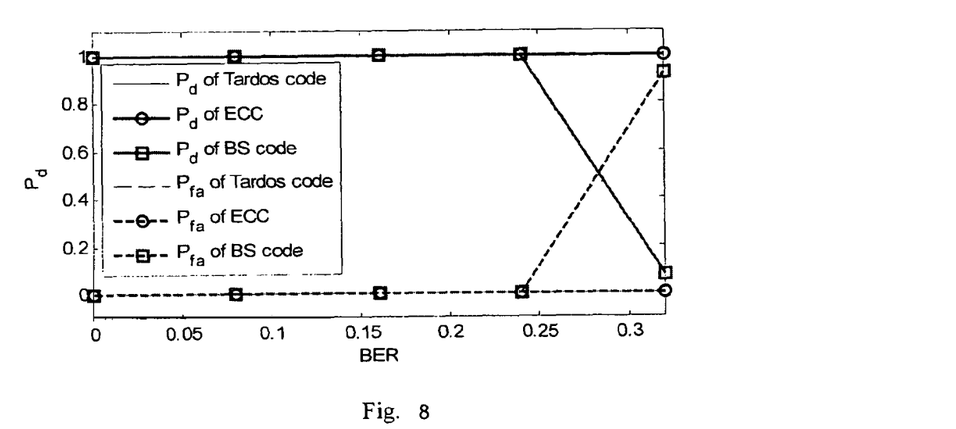
FIG. 8 shows the probability of detection of the Tardos code, the improved ECC-based code of the present invention and the BS code under a majority attack with five colluders.
Figure 9:
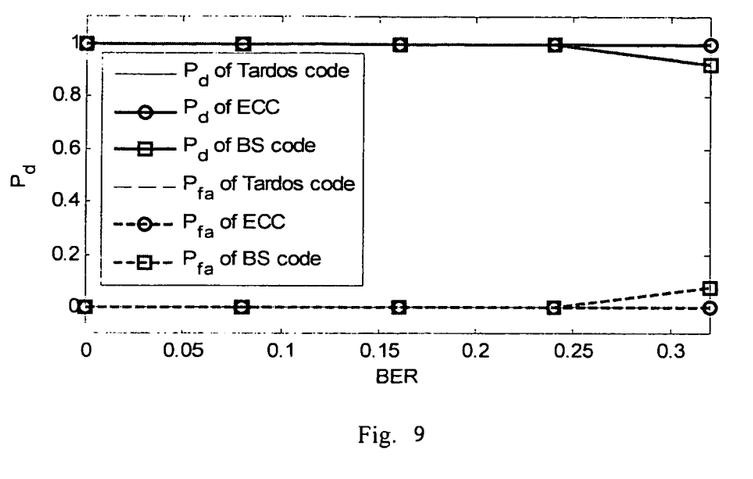
FIG. 9 shows the probability of detection of the Tardos code, the improved ECC-based code of the present invention and the BS code under an interleaving attack with five colluders.

FIG. 8 and FIG. 9 show the colluder-tracing performance of the Tardos code, the improved ECC code of the present invention and the BS code under majority and interleaving attacks with five colluders each. The total number of users is $2^{20}$, and the probability of a false alarm for the Tardos code and the BS code is set to be $10^{-3}$. The improved ECC code of the present invention uses 32 alphabets with outer-code length 31, and the concatenation/multiplication of modified Hadamard matrix of order four with exponential orthogonal code of order eight as the inner code. Under the test environment that BER ranged from 0 to 0.32, it is clear from FIG. 8 and FIG. 9 that the ECC code of the present invention achieves perfect detection as does the Tardos code. Thus, by reducing the code correlation (increasing the minimum distance of the outer codes), the collusion resistance of ECC code has been significantly improved. This can be achieved by using more alphabets. The correlation is reduced to (L−minimum distance+1)/L. The outer code minimum distance D=L−t+1 is approximately equal to q−t=q−$\log_q N_u$, where q=32. The exponential inner codes length is 2q with q=32. That is $2^{32}$ is approximately equal to $4\times10^9$. The overall code length should be less than $6\times10^9$ and the inner code length should be less than $2\times10^5$. It was found that the Tardos code used ten thousand (10,000) times more computational power and storage than the improved ECC based code of the present invention.

Figure 4:
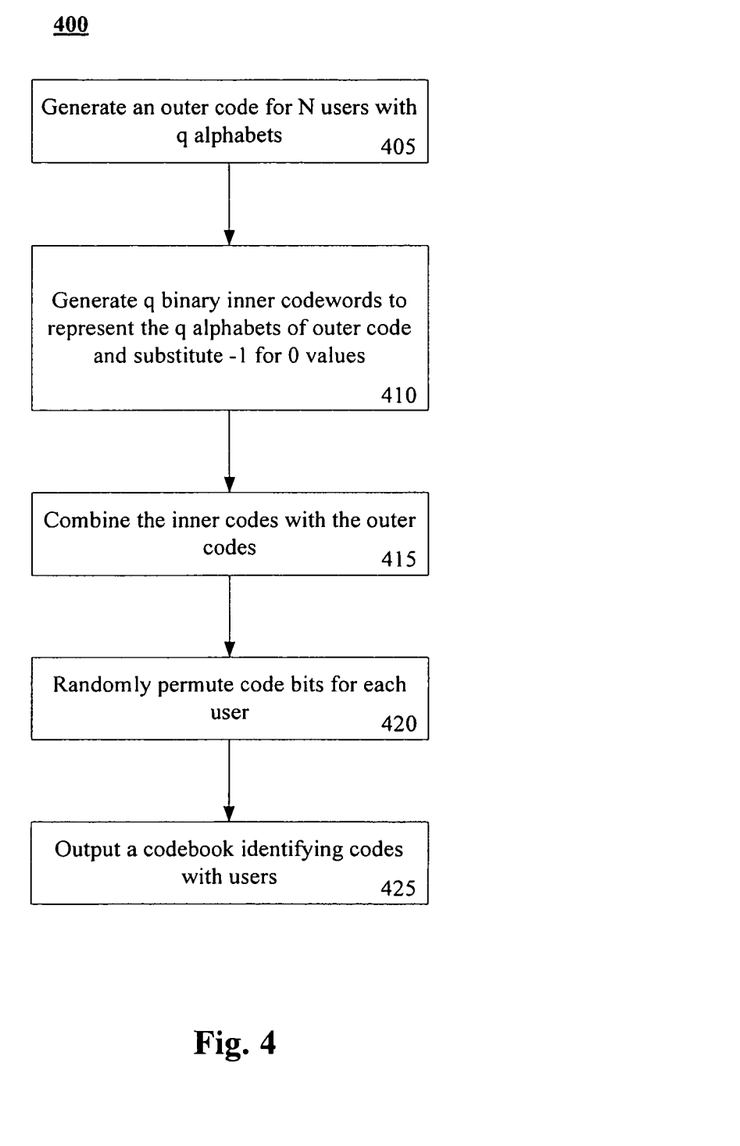
FIG. 4 depicts generation of an ECC-based code according to the principles of the present invention.

FIG. 4 depicts the process 400 of generating a forensic codebook of users using an ECC-based process. This process 400 is useful for both the basic ECC and for the improved ECC that is an aspect of the current invention. The process 400 follows the process depicted in FIGS. 3a-d. At step 405, an outer code, such as a Reed Solomon code, is generated for N users with q alphabets. Generally, an input parameter for generation of an outer code includes the number of users, the alphabet size q, and the desired outer code length. At step 410, the inner code is generated. Here, q binary inner codewords are generated to represent the q alphabets of the outer code. Values of −1 are used for zero states to accommodate the algorithms used. Generally, an input parameter for generation of an inner code includes the alphabet size q and the overall length of the desired inner code. At step 415, the inner codes are combined with the outer codes. In one embodiment, the inner codes are substituted into the outer code. At step 420, the resulting inner and outer code is randomly permuted according to a known randomization algorithm for each user. Thus, a bit-level randomization is applied for each user. The resulting codeword for each authorized user is essentially used as one of the entries for that user in a codebook of user forensic codes. This codebook is then useful in a detection process to uncover attackers/colluders in an unauthorized content distribution scheme. Step 425 outputs either a single codeword or an entire codebook which can be used to correspond to authorized users. The generated codewords are embedded into digital content.

Figure 5:
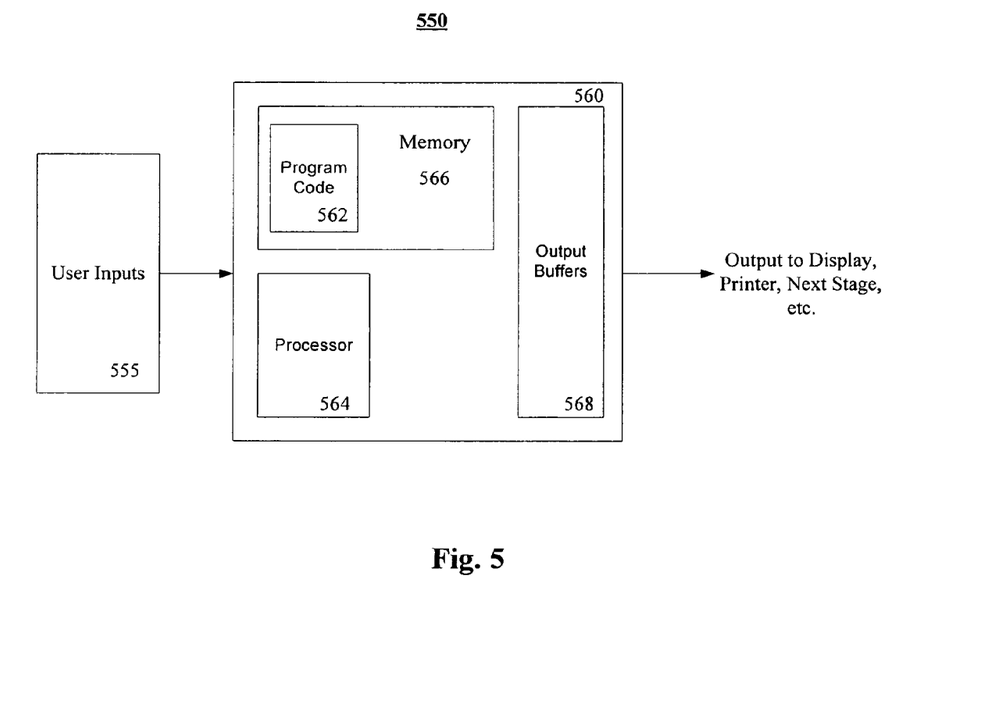
FIG. 5 is a block diagram of an apparatus for ECC-based code generation operating in accordance with the principles of the present invention.

FIG. 5 depicts a system 550 that generates a codebook using the principles of the present invention. The codebook generation device 560 receives inputs 555 from a system 550 user. Those inputs include inputs needed to generate both an outer code and an inner code. For an outer code definition, such as a Reed Solomon code, the input parameters entered by a system 500 user include the number of intended content users (such as a distributor/user), the alphabet size (q), and the Reed Solomon code length (L). The input parameters for an inner code according to aspects of the invention include the alphabet size (q), and the total length of the inner codeword. The codeword generation device 560 includes a processor 564 having access to computer code 562 that contains computer instructions to generate an outer and inner code in accordance with the present invention. The computer code may be in the form of fixed or removable computer-readable media such as magnetic, optical, or solid state memory. In one embodiment, the code resides in memory 566 which is accessible to the processor for not only the computer instructions, but may also be used by the computer for storage related to processing the codewords according to the needs of the computer code. The processor also has access to output buffers 568 useful to buffer and drive the generated codewords out of the device 560 and to a tangible embodiment such as a printer, a display, or, in the case of a system such as in FIG. 1 or 2, a downstream stage that will use the codeword in either an encoding or detection process. As is well understood by those of skill in the art, the embodiment of FIG. 5 is not limiting because many variations of hardware and software or firmware implementations are possible within the scope and spirit of the present invention.

Figure 6:
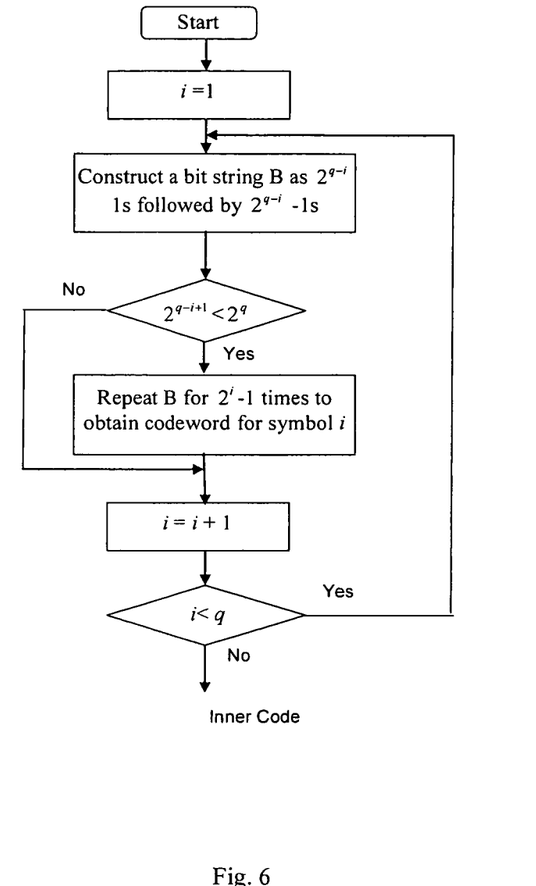
FIG. 6 is a flowchart depicting the construction of the exponential code using the ECC-based codes generated in accordance with the principles of the present invention.

FIG. 6 is a flowchart depicting the construction of the exponential code using the ECC-based codes generated in accordance with the principles of the present invention. Specifically, at 605 a counter is initialized. At 610, 615 and 620 a codeword is generated by generating a bit string of 1s and −1s as described above. The counter is incremented at 625. While described herein as a counter that is incremented, the counter could be initialized at a maximum and decremented without loss of generality. A test is performed at 630 to determine if the counter is less than q to determine if the inner code has been generated.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
generating a unique code for each of a plurality of users using a plurality of symbols;
generating a plurality of inner codes representing said plurality of symbols, wherein said second generating act further comprises generating a string of first symbols followed by second symbols, and further wherein said first symbols are all ones and said second symbols are all negative ones, wherein there is an equal quantity of said first symbols and said second symbols in each generated inner code, and further wherein if a length of said first symbols followed by said second symbols is less than a predetermined length of each of said plurality of inner codes, then said first symbols followed by said second symbols are repeated until said code length is filled, wherein said plurality of inner codes representing said plurality of symbols is an exponential orthogonal code;
substituting said plurality of inner codes into said unique code for each of said plurality of users;
permuting said code resulting from said substitution to produce a codeword for each of said plurality of users; and
embedding said codeword into digital content.

2. The method according to claim 1, further comprising outputting each said codeword identifying users with a corresponding codeword.

3. The method according to claim 1, wherein said symbols are alphabets.

4. The method according to claim 1, wherein said unique code is a Reed-Solomon code.

5. The method according to claim 1, further comprising receiving input parameters including a number of users, a symbol size and a unique code length.

6. The method according to claim 1, further comprising multiplying a first of said plurality of code by a second of said plurality of codes to generate a third of said plurality of codes.

7. The method according to claim 1, further comprising multiplying a first of said plurality of codes by an orthogonal matrix to generate a second of said plurality of codes.

8. An apparatus, comprising:
means for generating a unique code for each of a plurality of users using a plurality of symbols;
means for generating a plurality of inner codes representing said plurality of symbols, wherein said second means for generating further comprises means for generating a string of first symbols followed by second symbols, and further wherein said first symbols are all ones and said second symbols are all negative ones, wherein there is an equal quantity of said first symbols and said second symbols in each generated inner code and further wherein if a length of said first symbols followed by said second symbols is less than a predetermined length of each of said plurality of inner codes, then said first symbols followed by said second symbols are repeated until said code length is filled, wherein said plurality of inner codes representing said plurality of symbols is an exponential orthogonal code;
means for substituting said plurality of inner codes into said unique code for each of said plurality of users;
means for permuting said code resulting from said substitution to produce a codeword for each of said plurality of users; and
means for embedding said codeword into digital content.

9. The apparatus according to claim 8, further comprising means for outputting each said codeword identifying users with a corresponding codeword.

10. The apparatus according to claim 8, wherein said symbols are alphabets.

11. The apparatus according to claim 8, wherein said unique code is a Reed-Solomon code.

12. The apparatus according to claim 8, further comprising means for receiving input parameters including a number of users, a symbol size and a unique code length.

13. The apparatus according to claim 8, wherein said apparatus further comprising a processor having therein storage that includes instructions executed on said processor for generating said codeword.

14. The apparatus according to claim 8, further comprising means for multiplying a first of said plurality of code by a second of said plurality of codes to generate a third of said plurality of codes.

15. The apparatus according to claim 8, further comprising means for multiplying a first of said plurality of codes by an orthogonal matrix to generate a second of said plurality of codes.

* * * * *